United States Patent [19]
Sato et al.

[11] Patent Number: 5,318,482
[45] Date of Patent: Jun. 7, 1994

[54] CHAIN GUIDE HAVING IMPROVED ARM-SHOE ATTACHMENT FEATURE

[75] Inventors: Masahiro Sato, Sakado; Atsushi Kumakura, Takatsuki, both of Japan

[73] Assignee: Tsubakimoto Chain Co., Osaka, Japan

[21] Appl. No.: 973,638

[22] Filed: Nov. 9, 1992

[30] Foreign Application Priority Data

Nov. 7, 1991 [JP] Japan ................................. 3-099409

[51] Int. Cl.⁵ ............................................. F16H 7/08
[52] U.S. Cl. ................................. 474/111; 474/140
[58] Field of Search ...................... 474/111, 138, 140

[56] References Cited
U.S. PATENT DOCUMENTS

| | | | |
|---|---|---|---|
| 3,426,606 | 2/1969 | Hopkins | 474/111 |
| 4,826,468 | 5/1989 | Friedrichs | 474/111 X |
| 5,045,032 | 9/1991 | Suzuki et al. | |
| 5,088,966 | 9/1991 | Suzuki et al. | |

OTHER PUBLICATIONS

U.S. patent application Ser. No. 07/867,860 entitled "Tensioner Lever Having an I-Shaped Section".
U.S. patent application Ser. No. 07/867,861 entitled "Floating Preventive Structure for Shoe of Tensioner Lever" will issue on Feb. 9, 1993 as U.S. Pat. No. 5,184,983.

*Primary Examiner*—Ramon S. Britts
*Assistant Examiner*—Roger J. Schoeppel
*Attorney, Agent, or Firm*—Howson & Howson

[57] ABSTRACT

A chain guide for automobile camshaft drive chains and the like comprises a lever arm having a mounting hole for receiving a pivot shaft, and a synthetic resin chain-engaging shoe having a pair of tongues, which embrace the arm on both sides, and which have holes aligned with the mounting hole of the arm, so that the shoe cannot disengage the arm when the shoe and arm are mounted on the pivot shaft. The tongues have convex portions which engage concave contoured steps on the sides of the arm with a snap fit, so that the shoe is held in proper relationship to the arm before mounting on the pivot shaft.

4 Claims, 7 Drawing Sheets

CHAIN GUIDE HAVING IMPROVED ARM-SHOE ATTACHMENT FEATURE

SUMMARY OF THE INVENTION

This invention relates to chain guides, and more particularly to an improved attachment feature for securing a synthetic resin chain-contacting shoe to a shoe-supporting arm.

Chain guides are used in various applications, a common one being the guiding of a timing chain for operating the valve-operating cam in an automobile engine. In a typical chain guide of the conventional kind, a rubber chain-contacting shoe is adhesively secured to a metallic arm. The arm is pivotally mounted so that it can move to accommodate changes in the tension of the chain. The shoe has a chain-engaging surface on which the chain rides, and side walls along both side edges of the chain-engaging surface to guide the chain.

In the conventional chain guide, since the shoe is made of rubber, a number of problems arise. First, since the rubber has poor heat resistance, it is easily damaged by the chain at elevated ambient temperatures of about 120° C. Second, because of the low mechanical strength of the rubber shoe, the side walls are apt to be damaged by the chain. Third, with long-term use, the shoe is likely to separate from the arm.

One object of the invention is to provide an improved chain guide in which separation of the shoe from the arm is more effectively prevented.

Another object of the invention is to provide an improved chain guide which has improved mechanical strength and heat resistance and which is capable of withstanding use over a long period of time.

Still another object of the invention is to decrease the degree of damage to the shoe caused by the chain even at a high ambient temperatures.

Still another object of the invention is to provide a novel chain guide structure comprising an arm and a synthetic resin, chain-contacting shoe which are not adhesively secured together, but which are simply and securely held together when the chain guide is in use.

Still another object of the invention is to provide a novel chain guide structure comprising an arm and a synthetic resin chain-contacting shoe which are not adhesively secured together, and in which separation of shoe from the arm prior to mounting of the chain guide is prevented.

The invention addresses the above objects by means of a chain guide structure in which a resin shoe has a pair of tongues which are located on both sides of the arm and which have holes aligned with the mounting hole in the arm, and by providing interengaging convex and concave surfaces on the tongues and the sides of the arm to prevent the shoe from disengaging from the arm before the assembly is mounted for use.

More specifically, the chain guide in accordance with the invention comprises an arm having a shoe-supporting surface for supporting a chain-contacting shoe, two opposite side faces, and a mounting hole extending through a part of said arm from one of said two opposite side faces to the other; and a chain-contacting shoe, made of resin, extending along said shoe-supporting surface, said chain-contacting shoe having a chain-contacting surface and a pair of tongues extending away from said chain-contacting surface on said opposite side faces of the arm whereby at least the part of said arm through which the mounting hole extends is sandwiched between said tongues, said tongues both having through holes in alignment with said mounting hole.

When the chain guide is mounted, a shaft is passed through the mounting hole in the arm to mount the chain guide to a mounting wall. The mounting shaft also passes through the through holes of the shoe. Consequently, the arm and the shoe are held together by the mounting shaft, so that separation of the shoe from the arm is prevented.

In a preferred form of the chain guide, the tongues of the shoe and the side faces of the arms have means, comprising interengaging convex and concave portions, for preventing separation of the shoe from the arm. Even though the shoe is not adhesively secured to the arm, the interengaging convex and concave portions hold the shoe and arm together prior to mounting.

DETAILED DESCRIPTION

Figure 14:
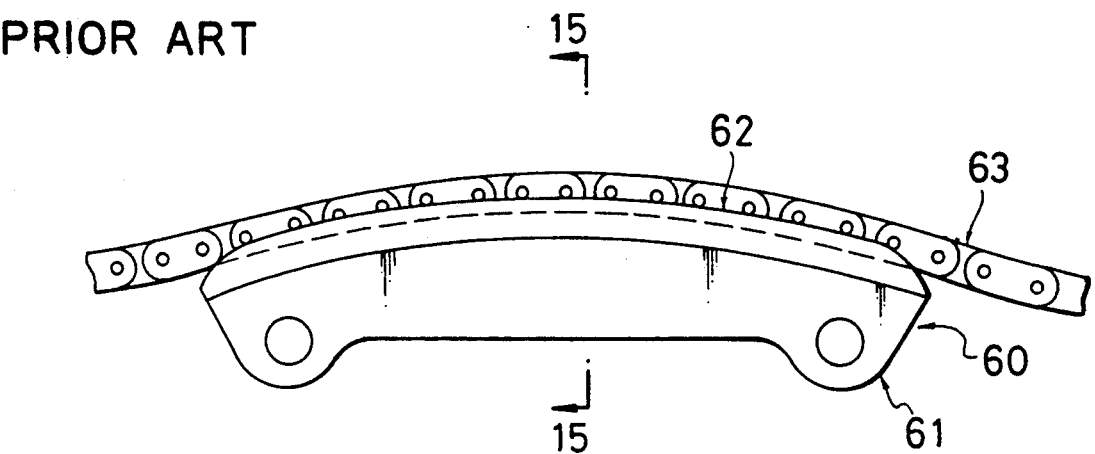
FIG. 14 is a side elevation of a conventional chain guide.
Figure 15:
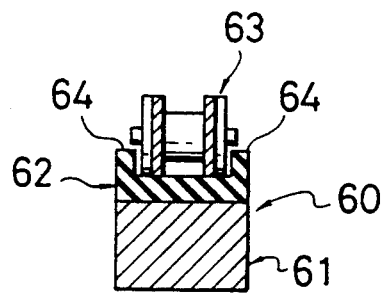
FIG. 15 is a sectional view taken on plane 15—15 in FIG. 14.
Figure 16:
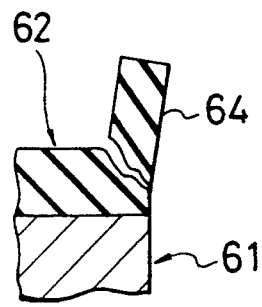
FIG. 16 is a fragmentary cross-sectional view of a conventional chain guide showing the shoe in a damaged condition.

Referring first to the prior art, FIGS. 14–16 show a conventional chain guide 60 having a rubber shoe 62 affixed to a metallic arm 61 by means of an adhesive or the like. After long-term use, the adhesive can fail and allow separation of shoe 62 from arm 61. Further, as mentioned previously, the heat resistance of the rubber is poor, and consequently it is easily damaged by the chain at a high ambient temperature of 120° C. or so. Finally, because of the low mechanical strength of the rubber shoe, a side wall 64 is apt to be damaged by the chain 63, as shown in FIG. 16.

Figure 8:
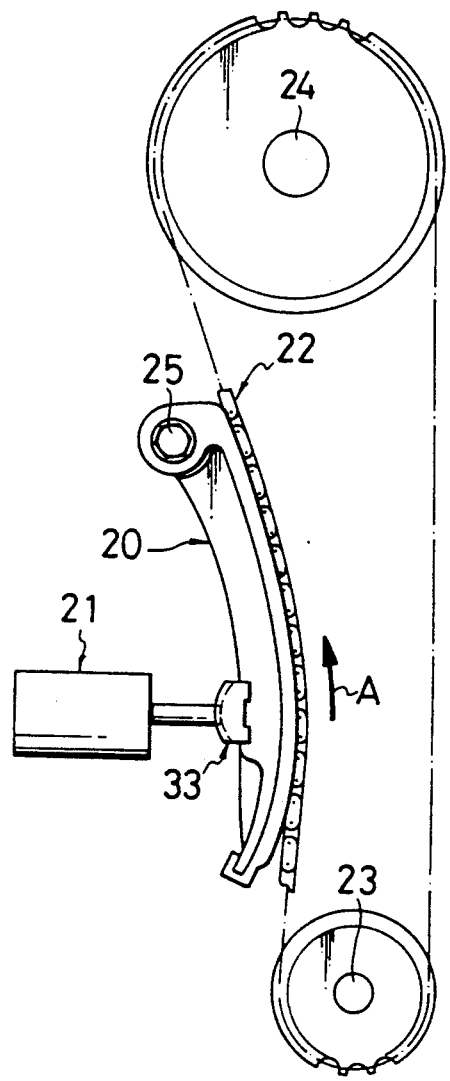
FIG. 8 is a schematic elevational view showing the chain guide in use in conjunction with a chain extending between two sprockets.

FIG. 8 shows a chain guide, in accordance with a first embodiment of the invention, guiding and applying tension to a chain transmitting driving power between two sprockets. The chain guide 20 is in the form of a pivoted lever, which is pressed by a tensioner 21 against a chain 22 to impart an appropriate tension to the chain 22 at all times, thereby preventing vibration of the chain. The tensioner can be a conventional fluid tensioner having an internal spring urging a piston in the projecting direction and having a restricted passage for the flow of hydraulic fluid in a first direction past the piston and a one-way check valve allowing rapid flow of hydraulic fluid in the opposite direction, thereby allowing rapid projecting movement of the piston, but only allowing slow retracting movement.

Chain 22 can be, for example, an automobile engine timing chain serving to transmit rotating power from an automobile crankshaft 23 to a camshaft 24 which opens and closes the valves of the engine. In this application, the chain guide 20 can be pivotally mounted on an engine block 26, as shown in FIG. 6, by means of a mounting bolt 25.

The chain guide 20, as shown in FIGS. 1-8, comprises an elongated aluminum arm 31, a elongated shoe 32 which is mounted on the arm 31 and comes into contact with the chain 22, and a pad 33 for engagement by the piston rod of tensioner 21. The chain guide 20 guides the chain 22, which travels in the direction of arrow A in FIGS. 1 and 8. Shoe 32 and pad 33 are made of a resin, preferably a suitable engineering plastic.

A guide slot 34, for guiding chain 22, is formed in the outer surface of shoe 32.

Figure 6:
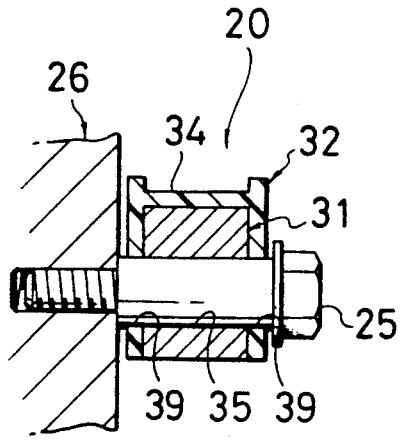
FIG. 6 is a sectional view of the chain guide, taken on a plane in which the axis of the mounting hole lies, showing the guide in the mounted condition.
Figure 7:
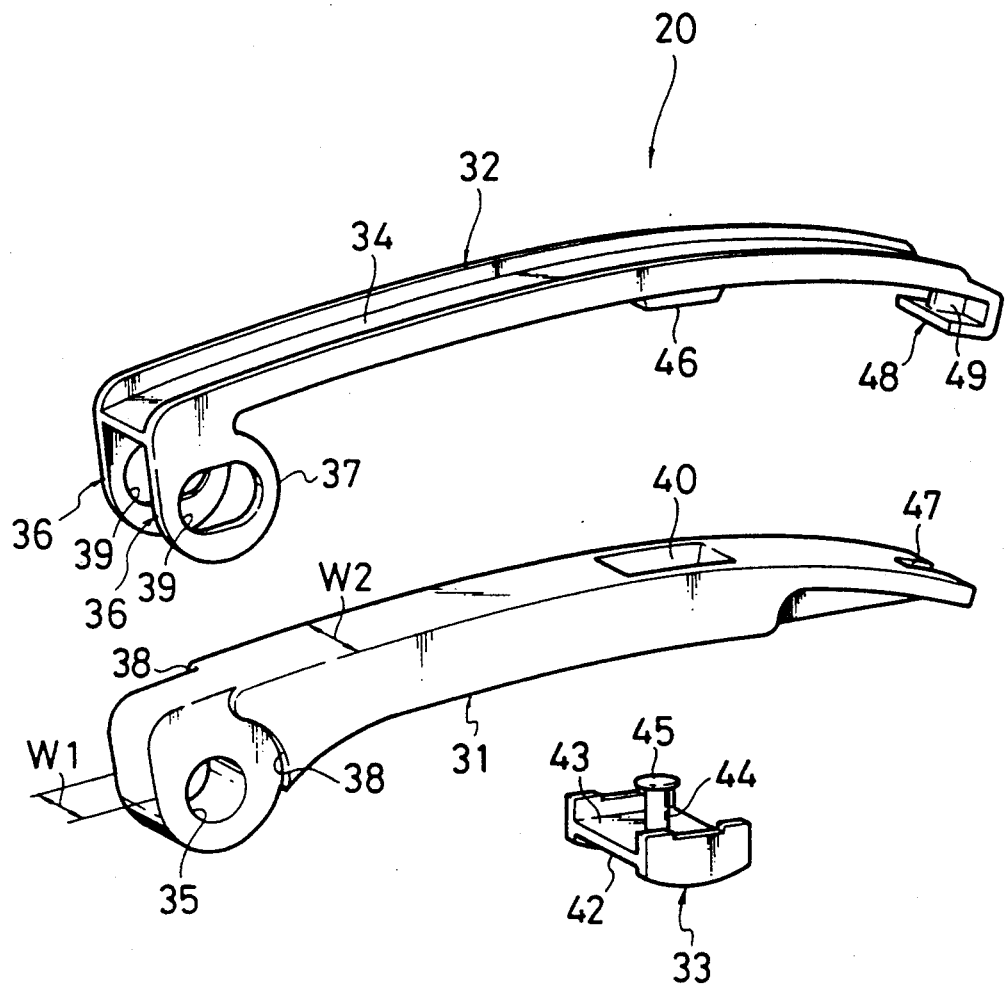
FIG. 7 is an exploded perspective view of the chain guide.

In the leftmost end (in FIG. 1) of arm 31 there is formed a mounting hole 35 for receiving mounting bolt 25 (FIG. 6). The width W1 of the leftmost end of the arm 31, as seen in FIG. 7, is narrower than the width W2 of the other portion of the arm. The boundaries at which the portions of the arm having different widths meet are in the form of steps 38, each having a concave arcuate shape. These concave steps 38, in cooperation with convex portions 37 formed on tongues 36 of shoe 32, serve to prevent separation of the shoe from the arm before the guide is mounted on the engine block.

The pair of tongues 36, which are formed at the leftmost end (in FIG. 1) of shoe 32 extend, in substantially parallel relation to each other, and in substantially perpendicular relation to the chain-engaging bottom surface of the guide slot 34. Tongues 34 are coplanar with the respective side walls of the guide slot. The leftmost end of arm 31 is sandwiched between the tongues. In each tongue 36, there is formed a through hole 39. The through holes 39 are in alignment with mounting hole 35 of arm 31 when the shoe is engaged with the arm. Holes 35 are slightly elongated in directions parallel to the length of the arm.

When chain guide 20 is mounted pivotally on the engine block 26 mounting bolt 25 extends through mounting hole 35 of arm 31 and also through holes 39, as shown in FIG. 6. Consequently, arm 31 and the shoe 32 are integrally mounted on mounting bolt 25 and so there is no possibility of separation of the shoe from the arm.

When chain guide 20 is mounted on engine block 26, the tongues 36 prevent dislocation of the shoe 32 in the direction of the width of the arm. At the same time, the elongated holes 39 in the tongues allow differential expansion of the shoe and arm in the longitudinal direction due to temperature variations.

Convex portions 37 on the tongues engage concave portions 38 of arm 31 with a snap fit. The engagement of the tongues with the concave portions of the arm prevents separation of shoe 32 from arm 31 during the time interval between the mounting of the shoe on the arm and the mounting of the chain guide on the engine block.

Figure 1:
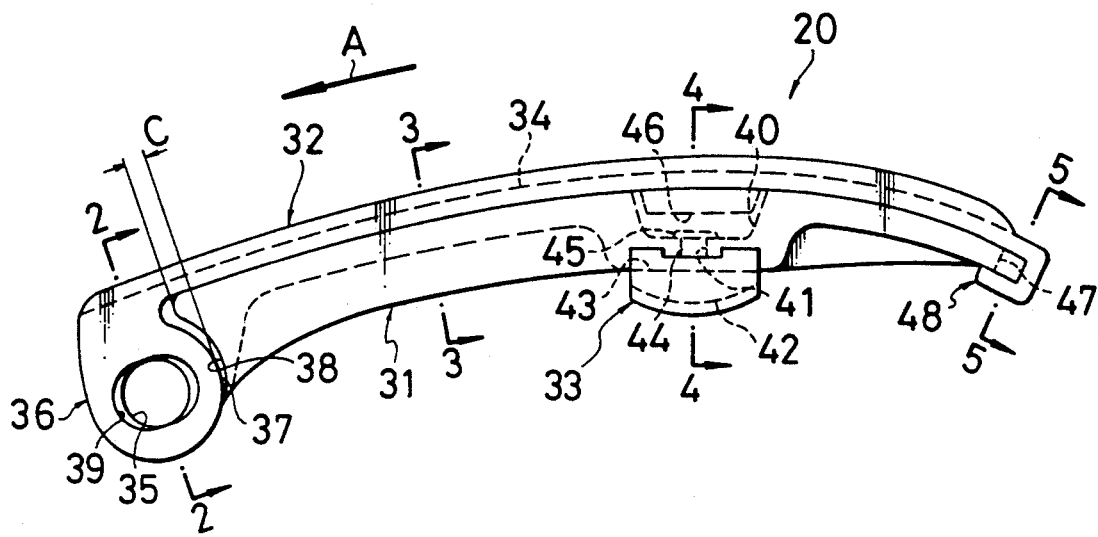
FIG. 1 is a side elevation of a chain guide in accordance with a first embodiment of the invention.
Figure 2:
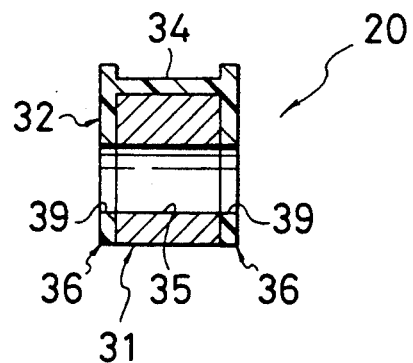
FIG. 2 is a sectional view taken on plane 2—2 in FIG. 1.
Figure 3:
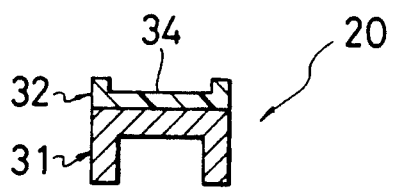
FIG. 3 is a sectional view taken on plane 3—3 in FIG. 1.
Figure 4:
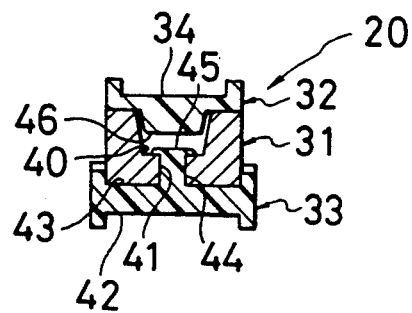
FIG. 4 is a sectional taken on plane 4—4 in FIG. 1.

As seen in FIG. 1, the depth C of the engagement of the separation preventing concave and convex portions 38 and 37 is selected to facilitate the snap-fitting engagement of tongues with the arm and to prevent accidental disengagement of the shoe from the arm before mounting of the chain guide assembly on the engine block.

In an intermediate part of the arm 31 there is formed a weight reducing recess 40, and in the bottom of the recess 40 there is formed a pad mounting hole 41 (FIGS. 1 and 4) for the mounting of pad 33. As shown in FIG. 8, pad 33 is disposed for abutment by the end of the piston rod of tensioner 21. The surface of the pad 33 with which the tensioner 21 comes into abutment is formed with a groove 42 for preventing the disengagement of the tensioner piston rod from the pad. On the surface of the pad 33 facing arm 31 there are formed a groove 43 to receive the arm and prevent rotation and dislocation the pad, and a mounting shaft 44 for insertion into pad mounting hole 41. At the front end of mounting shaft 44 there is formed a dislodgement-preventing flange 45.

An intermediate part of the shoe 32 is formed with a convex portion 46 which enters into recess 40 in arm 31, as shown in FIGS. 1 and 7. Engagement of convex portion 46 with recess 40 prevents dislocation of shoe 32 in the direction of the width of the arm.

Figure 5:
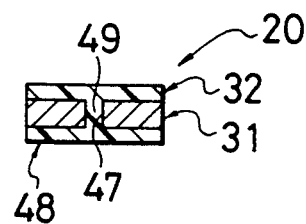
FIG. 5 is a sectional view taken on plane 5—5 in FIG. 1.

As shown in FIGS. 5 and 7, a slot 47 is formed in the rightmost end of arm 31 and extends parallel to the length of the arm 31. The rightmost end of shoe 32 is formed with a U-shaped hook 48. Inside the hook 48, there is formed a projection 49 which connects the upper and lower inside portions of the hook. This projection 49 is positioned to enter slot 47 as the shoe and arm are assembled together. The engagement of the U-shaped hook 48 with the end of the arm prevents the hooked end of the shoe from separating from the arm and prevents the shoe from sliding relative to the arm in the direction of chain travel, i.e. the direction designated by arrow A in FIGS. 1 and 8. The engagement of projection 48 with slot 47 prevents dislocation of the shoe in the direction of the width of the arm.

Mounting of the shoe 32 to the arm 31 is performed by bringing hook 48 of shoe 32 into engagement with the rightmost end of arm 31, then fitting convex portion 46 of the shoe into recess 40 of the arm, and finally snapping tongues 36 into place on both sides of the end portion of the arm at the location of mounting hole 35, so that convex portions 37 of the shoe are engaged with the separation preventing concave portions 38 of the arm while both sides of the leftmost end of the arm are sandwiched between the tongues 36.

Figure 9:
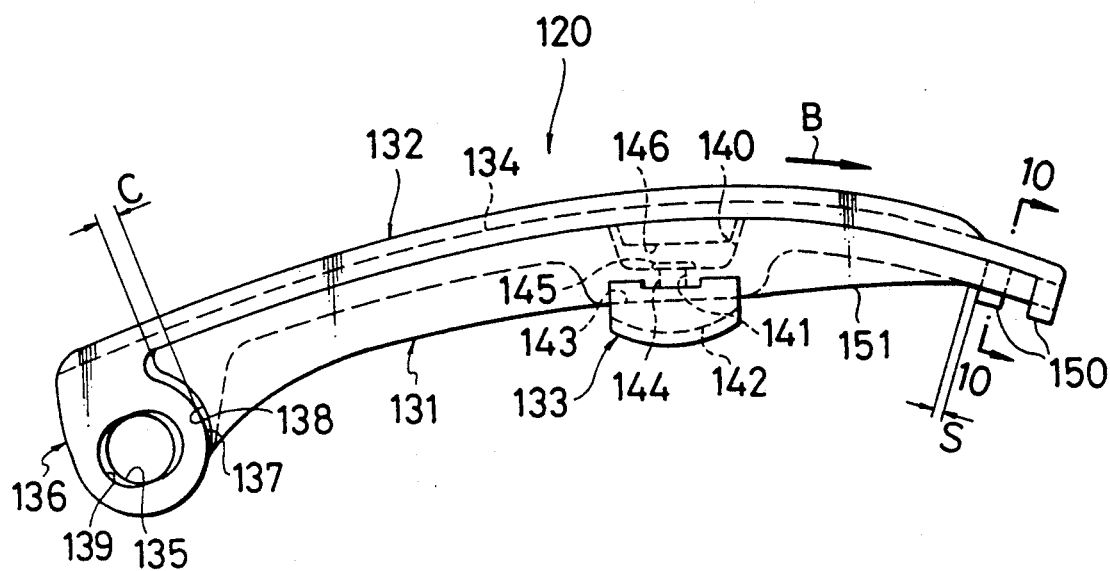
FIG. 9 is a side elevation of a chain guide according to a second embodiment of the invention.
Figure 10:
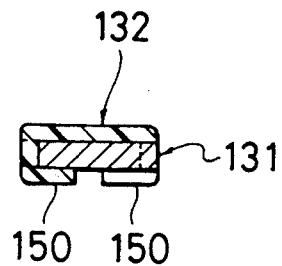
FIG. 10 is a sectional view taken on plane 10—10 in FIG. 9.

In the second embodiment of the invention, as depicted in FIGS. 9 and 10, various elements are numbered with reference numerals exceeding the reference numerals for the corresponding parts in FIGS. 1-7 by 100. A chain guide 120 guides a chain (similar to chain 22 in FIG. 8) which travels in the direction of arrow B.

Chain guide 120 is different from chain guide 20, in the shape of its rightmost end. On opposite sides of the shoe 132 there are formed a pair of L-shaped mounting elements 150 configured so that they embrace the rightmost end of arm 131 on both sides thereof.

Dislocation of shoe 132 in the direction of the width of arm 131, and separation of the shoe from the arm, are prevented by the mounting elements 150.

The dimensions of gap S, between the leftmost mounting element 150 and the reinforcing web 151 of arm 131, and the engagement depth C of separation-preventing concave and convex portions 138 and 137, are selected to facilitate snap engagement of the concave and convex portions 138 and 137 Which prevents disengagement of shoe 132 from arm 131.

Figure 11:
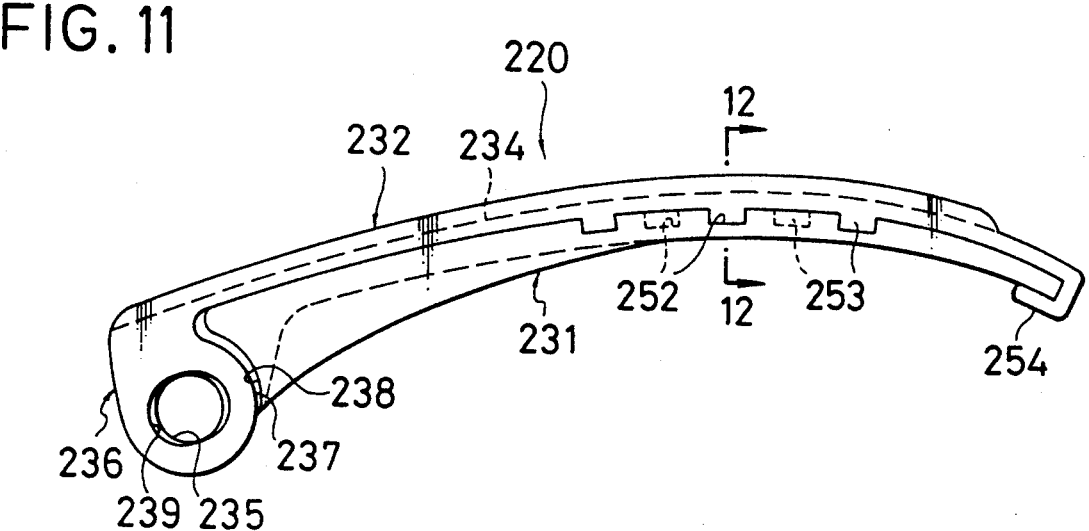
FIG. 11 is a side elevation of a chain guide according to a third embodiment of the invention.
Figure 12:
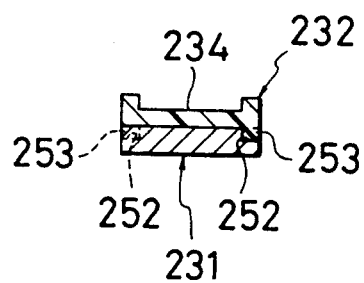
FIG. 12 is a sectional view taken on plane 12—12 in FIG. 11.

A third embodiment, chain guide 220 shown in FIGS. 11 and 12, does not have its own pad, and can be used in the case where a pad is provided on the tensioner piston. Here, the reference numerals for various parts exceed those for corresponding parts in FIGS. 1-7 by 200.

An intermediate portion of an arm 231, and the intermediate portion of a shoe 232, are made integral with each other by engagement of plural concave recesses 252 formed on both sides of the arm with plural convex projections 253 formed on both sides of the shoe. Dislocation of shoe 232 in both the transverse and longitudinal directions with respect to arm 231 is prevented by the engagement of the concave recesses 252 by the convex projections 253.

Referring to FIG. 11, the rightmost end of shoe 232 is formed with a hook 254 for engagement with the rightmost end of the arm 231, whereby the separation of shoe 232 from the arm is prevented.

Figure 13:
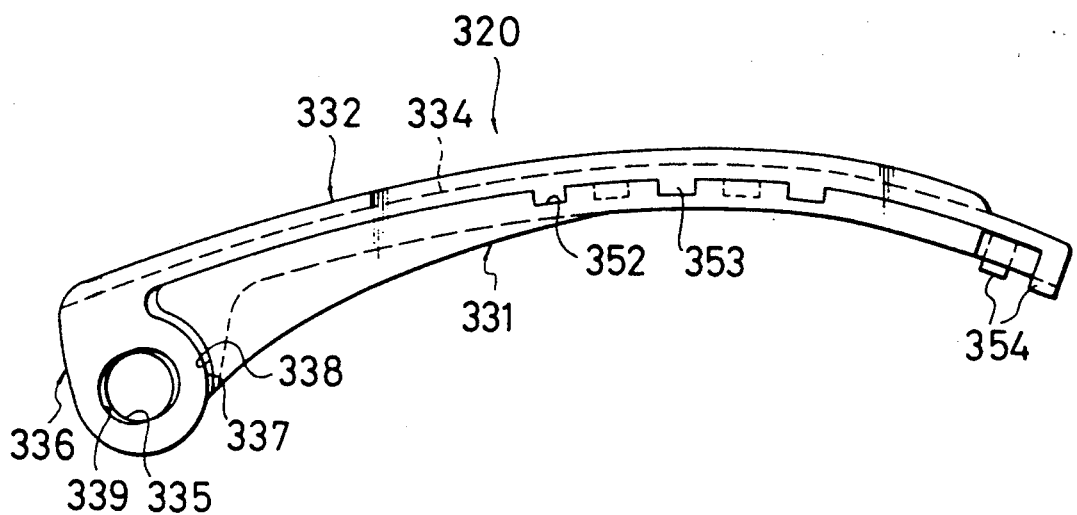
FIG. 13 is a front view of a chain guide according to a fourth embodiment of the invention.

In the fourth embodiment, shown in FIG. 13, various parts are numbered with reference numerals exceeding by 300 the numerals for corresponding parts in FIGS. 1-7. A chain guide 320 does not have its own pad and it is used in the case where a pad is provided on the piston of the tensioner.

An intermediate portion of an arm 331 and an intermediate portion of a shoe 332 are made integral with each other by engagement of plural concave recesses 352 formed on both sides of the arm with plural convex projections 353 formed on both sides of the shoe. Dislocation of shoe 352 in both transverse and longitudinal directions with respect to arm 331 is prevented by the engagement of the concave recesses 352 by convex projections 353

At the rightmost end (in FIG. 13) of shoe 332 there are formed a paid of L-shaped mounting elements 354 extending from both sides of the shoe in such a manner as to embrace the rightmost end of the arm from both sides in a manner similar to that depicted in FIGS. 9 and 10. Dislocation of shoe 332 in the transverse direction, and separation of the shoe from the arm, are prevented by mounting elements 354.

Since, in each embodiment of the invention, the arm and the shoe are mounted on the same mounting shaft, separation of the shoe from the arm is essentially impossible when the guide assembly is in the mounted condition.

Since the shoe is made of resin, its mechanical strength and heat resistance are improved, with a resulting increase in its useful life. Furthermore, by making the shoe from a resin, the extent of damage of the shoe caused by the chain is decreased, even at a high ambient temperatures.

A further advantage of the invention, arising by virtue of the snap-fitting tongues and interengaging convex and concave portions, is that it is possible to prevent the separation of shoe and arm prior to mounting of the chain guide on an engine block.

Various modifications other than those shown can be made to the chain guide without departing from the scope of the invention as defined in the following claims.

We claim:

1. A chain guide comprising:
   an arm having a show-supporting surface for supporting a chain-contacting show, two opposite side faces, and a mounting hole extending through a part of said arm from one of said two opposite side faces to the other;
   a unitary chain-contacting show, made of resin, extending along said show-supporting surface, said chain-contacting show having a chain-contacting surface and including a pair of tongues extending away from said chain-contacting surface on said opposite side faces of the arm whereby at least the part of said arm through which the mounting hole extends is sandwiched between said tongues, said tongues both having through holes in alignment with said mounting hole so that a pivot shaft can extend through said through holes and said mounting hole;
   the chain-contacting shoe being separable from the arm when no pivot shaft is present in said through holes and said mounting hole.

2. A chain guide according to claim 1, in which said tongues and said side faces have means, comprising interengaging convex and concave portions, for preventing separation of the chain-contacting show from the arm.

3. A chain guide according to claim 1, wherein said arm and said show are provided with mutually engaging means for preventing the shoe from sliding on the shoe supporting surface in a first direction, and in which said side faces are provided with concave recesses extending in a direction opposite to said first direction, and said tongues are provided with convex edges conforming to, and receivable in, said recesses, said recesses being undercut to a depth such that the shoe and arm can be snapped together and held together temporarily when no pivot shaft is present in said through holes and said mounting hole.

4. A chain guide according to claim 1 in combination with a pivot shaft extending through said through holes and said mounting mole.

* * * * *